United States Patent
Tiri et al.

(10) Patent No.: US 12,206,495 B2
(45) Date of Patent: Jan. 21, 2025

(54) RECEPTION OF DIGITAL RADIO SIGNALS USING LINEAR COMBINATION OF ESTIMATED BITS

(71) Applicant: Nordic Semiconductor ASA, Trondheim (NO)

(72) Inventors: Hanna-Liisa Tiri, Trondheim (NO); Mauri Nissilä, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 525 days.

(21) Appl. No.: 17/620,641

(22) PCT Filed: Jun. 22, 2020

(86) PCT No.: PCT/NO2020/050171
§ 371 (c)(1),
(2) Date: Dec. 17, 2021

(87) PCT Pub. No.: WO2020/263099
PCT Pub. Date: Dec. 30, 2020

(65) Prior Publication Data
US 2022/0303050 A1    Sep. 22, 2022

(30) Foreign Application Priority Data

Jun. 28, 2019    (GB) .................................... 1909348

(51) Int. Cl.
*H04L 1/00*    (2006.01)
*H04L 1/08*    (2006.01)
*H04L 1/1829*    (2023.01)

(52) U.S. Cl.
CPC .......... *H04L 1/0047* (2013.01); *H04L 1/0061* (2013.01); *H04L 1/0067* (2013.01); *H04L 1/08* (2013.01); *H04L 1/1845* (2013.01)

(58) Field of Classification Search
CPC ................. H04L 1/0047; H04L 1/0061; H04L 1/0067; H04L 1/08; H04L 1/1845; H04L 1/1835
See application file for complete search history.

(56) References Cited

U.S. PATENT DOCUMENTS 8,429,475 B2    4/2013 Duggan
2006/0103546 A1    5/2006 Salser, Jr. et al.
(Continued)

FOREIGN PATENT DOCUMENTS

BE    799257 A    8/1973
CN    1345488 A    4/2002
(Continued)

OTHER PUBLICATIONS

Office Action (with English translation) issued in China Patent Application No. 202080059085.4, dated Nov. 13, 2023, 12 pages.
(Continued)

*Primary Examiner* — Habte Mered
(74) *Attorney, Agent, or Firm* — Klarquist Sparkman, LLP

(57) ABSTRACT

A digital radio receiver receives an encoded digital radio signal comprising a plurality of bits. The receiver determines a plurality of soft bits representing estimates of the bits and stores the soft bits in a rate de-matching buffer. The receiver calculates a first linear combination of soft bits from a first subset of the buffer and a second linear combination of soft bits from a second subset of the buffer. The receiver calculates a ratio between the first and second linear combinations and compares the ratio to an expected value. The receiver then determines its operational state based on the comparison.

18 Claims, 7 Drawing Sheets

(56) References Cited

U.S. PATENT DOCUMENTS

| | | | |
|---|---|---|---|
| 2008/0144628 A1 | 6/2008 | Tsai et al. | |
| 2013/0047051 A1* | 2/2013 | Niewczas | H04L 1/1812 |
| | | | 714/751 |
| 2013/0107993 A1 | 5/2013 | Müller-Weinfurtner et al. | |
| 2013/0205176 A1 | 8/2013 | Qian et al. | |
| 2014/0362942 A1* | 12/2014 | Wood | H04B 15/00 |
| | | | 375/267 |
| 2018/0262299 A1 | 9/2018 | Gho et al. | |
| 2018/0359052 A1* | 12/2018 | Wei | H04L 25/03318 |
| 2022/0263522 A1* | 8/2022 | Liu | H03M 13/635 |
| 2023/0031301 A1* | 2/2023 | Li | H04L 7/042 |

FOREIGN PATENT DOCUMENTS

| | | |
|---|---|---|
| CN | 104205770 A | 12/2014 |
| CN | 104604303 A | 5/2015 |
| EP | 1 717 975 A1 | 11/2006 |
| EP | 2 224 634 A2 | 9/2010 |
| EP | 2 398 179 A2 | 12/2011 |
| JP | 2007228140 A | 9/2007 |
| WO | WO-2015010732 A1 * 1/2015 ........ H03M 13/2957 |
| WO | WO2015/101384 A1 | 7/2015 |

OTHER PUBLICATIONS

IPO Search Report under Section 17(5) for GB1909348.3, mailed Apr. 14, 2020, 3 pages.

International Search Report and Written Opinion for PCT/NO2020/050171, mailed Dec. 14, 2020, 11 pages.

Land et al., "Using the mean reliability as a design and stopping criterion for turbo codes," *Proceedings 2001 IEEE Information Theory Workshop*, Sep. 2001, pp. 27-29.

* cited by examiner

RECEPTION OF DIGITAL RADIO SIGNALS USING LINEAR COMBINATION OF ESTIMATED BITS

CROSS REFERENCE TO RELATED APPLICATIONS

This is the U.S. National Stage of International Application No. PCT/NO2020/050171, filed Jun. 22, 2020, which was published in English under PCT Article 21 (2), which in turn claims the benefit of Norway Application No. 1909348.3, filed Jun. 28, 2019.

TECHNICAL FIELD

The present invention relates to receiving data packets via a radio communications network, particularly, although not exclusively, a cellular network such as a Long Term Evolution (LTE) network. It relates more particularly to communications where rate matching is applied.

BACKGROUND

In recent years, the extent and technical capabilities of cellular-based radio communication systems have expanded dramatically. A number of different cellular-based networks have been developed over the years, including the Global System for Mobile Communications (GSM), General Packet Radio Services (GPRS), Enhanced Data rates for GSM Evolution (EDGE), and Universal Mobile Telecommunications System (UMTS), where GSM, GPRS, and EDGE are often referred to as second generation (or "2G") networks and UMTS is referred to as a third generation (or "3G") network.

More recently, the Long Term Evolution (LTE) network, a fourth generation (or "4G") network standard specified by the $3^{rd}$ Generation Partnership Project (3GPP), has gained popularity due to its relatively high uplink and downlink speeds and larger network capacity compared to earlier 2G and 3G networks. More accurately, LTE is the access part of the Evolved Packet System (EPS), a purely Internet Protocol (IP) based communication technology in which both real-time services (e.g. voice) and data services are carried by the IP protocol. The air interface of LTE is often referred to as Evolved UMTS Terrestrial Radio Access (or "E-UTRA").

However, while "classic" LTE connections are becoming increasingly prevalent in the telecommunications industry, further developments to the communication standard are being made in order to facilitate the so-called "Internet of Things" (IoT), a common name for the inter-networking of physical devices, sometimes called "smart devices", providing physical objects that may not have been connected to any network in the past with the ability to communicate with other physical and/or virtual objects. Such smart devices include: vehicles; buildings; household appliances, lighting, and heating (e.g. for home automation); and medical devices.

These smart devices are typically real-world objects with embedded electronics, software, sensors, actuators, and network connectivity, thus allowing them to collect, share, and act upon data. These devices may communicate with user devices (e.g. interfacing with a user's smartphone) and/or with other smart devices, thus providing "machine-to-machine" (or "machine type") communication. However, the development of the LTE standards makes it more practical for them to connect directly to the cellular network.

3GPP have specified two versions of LTE for such purposes in Release 13 of the LTE standard. The first of these is called "NarrowBand IoT" (NB-IoT), sometimes referred to as "LTE Cat NB1", and the second is called "enhanced Machine Type Communication" (eMTC), sometimes referred to as "LTE Cat M1". It is envisaged that the number of devices that utilise at least one of these standards for IoT purposes will grow dramatically in the near future.

From a communications perspective, LTE standards (including NB-IoT and eMTC) use orthogonal frequency division multiple access (OFDMA) as the basis for allocating network resources. This allows the available bandwidth between to be shared between user equipment (UE) that accesses the network in a given cell, provided by a base station, referred to in LTE as an "enhanced node B", "eNodeB", or simply "eNB". OFDMA is a multi-user variant of orthogonal frequency division multiplexing (OFDM), a multiplexing scheme known in the art per se.

At the physical layer, in the downlink of an LTE connection, each data frame is 10 ms long and is constructed from ten sub-frames, each of 1 ms duration. Each sub-frame contains two slots of equal length, i.e. two 0.5 ms slots. Each slot (and by extension, each sub-frame and each frame) will typically contain a certain number of "resource blocks" (where each sub-frame has twice as many resource-blocks as a slot and each frame has ten times as many resource blocks as a sub-frame). A resource block is 0.5 ms long in the time domain and is twelve sub-carriers wide in the frequency domain. Generally speaking, there are seven OFDM symbols per slot and thus fourteen OFDM symbols per sub-frame, though this may vary. For example if the 'extended cyclic prefix (CP)' defined in eMTC is in use, there may be six OFDM symbols per slot and twelve OFDM symbols per sub-frame.

These resource blocks can be visualised as a grid of "resource elements", where each resource element is $\frac{1}{12}$ ms long with extended cyclic prefix and one sub-carrier wide, such that there are eighty-four resource elements per resource block (i.e. seven multiplied by twelve in the case of normal cyclic prefix) and one hundred and sixty-eight resource elements per sub-frame.

A downlink control channel between the eNB and the UE is used for setting up transmission or reception links (uplinks/downlinks) using appropriate control signalling between the UE and the eNB. This is achieved by transmission of "Downlink Control Information" (DCI) from the eNB to the UE. The DCI provides information on the resources that are to be allocated for a particular downlink or uplink channel such as the resource blocks and subframes as well as the modulation and coding schemes that are to be used by the downlink/uplink channel.

The DCI is transmitted over a control channel such as the Physical Downlink Control Channel (PDCCH), Enhanced Physical Downlink Control Channel (EPDCCH), MTC Physical Downlink Control Channel (MPDCCH) or Narrowband Physical Downlink Control Channel (NPDCCH). Since the DCI is required in order to set up the downlink channel, prior to its proper reception the UE does not know if or when information intended for it is being transmitted. The UE therefore carries out a process of "blind decoding" whereby it tries to decode different combinations of resource elements in all of the radio transmissions it receives to ascertain whether any of them represent the transmission of valid DCI. In order to make a determination as to whether a particular decoded bit-stream represents the required DCI, the UE compares what would be the DCI payload of the bitstream if it is a genuine DCI transmission with what would be the cyclic redundancy check (CRC) value, calculated according to a predetermined algorithm suffixed to the DCI payload. If the CRC matches the payload, the sequence is treated as having been successfully decoded and then used to set up the downlink channel for further transmissions.

Typically a UE will receive multiple downlink control information payloads via the downlink control channel, each payload being intended for a specific UE or group of UEs. Before they are decoded however, the UE does not know which DCI is actually intended for it. Various techniques are employed in order to resolve this. For example a modification may be made to the CRC such that a 'mask' is applied to it in the form of a Radio Network Temporary Identifier (RNTI), unique to a particular UE or group of UEs. This means that only the intended UE(s) will determine a successful CRC match, even if other UEs receive the information accurately. In addition to this UE specific search spaces of E/M/NPDCCH have UE specific scrambling sequences and demodulation reference signals. Additionally, UE specific search spaces of all the xPDCCH channels use a method where only a limited group of decoding candidates are actually decoded by a group of UE's (with a specific value of C-RNTI, or Cell RNTI, for each kind of PDCCH channel).

One of the downsides of the blind decoding approach is that there is a tendency to produce a high number of false positives. Most blind decoding attempts produce random bit sequences due to (a) the presence of mostly random noise and interference, especially on the unallocated parts of the physical control channel; and (b) the scrambling of encoded DCI's which ensures that decoding is only possible when using exactly the correct parameters. However, if a UE performs a high number of blind decoding attempts, the probability of a random sequence meeting the CRC check becomes significant. For example, the probability of a random sequence meeting a 16 bit CRC is ½^16. However if a UE is monitoring an empty control channel with 6 physical resource blocks (of 1 ms duration) for one minute, 360,000 blind decoding attempts will be carried out. Statistically, by assuming a binomial distribution for the probability of false positives, this corresponds to 5.4 false positives per minute.

Release 13 of the LTE standard introduced coverage enhancement for 'Bandwidth Reduced Low Complexity' (BL) and 'Coverage Enhancement' (CE) UEs by providing for repetition in physical downlink channels, in particular the physical downlink shared channel (PDSCH) and the MTC physical downlink control channel (MPDCCH).

The repetition of data on these channels is carried out across multiple sub-frames and is designed to provide an averaging gain when the signal power is low, i.e. when the signal-to-noise ratio (SNR) is low. There are two modes of coverage enhancement defined in the standard, 'Class A' and 'Class B'. Class A is a mandatory feature that defines a moderate number of repetitions while Class B is an optional feature that defines a higher number of repetitions. The maximum number of repetitions in Class A is 32 for PDSCH while the maximum number of repetitions in Class B is 2048 for PDSCH.

Similarly, in NB-IoT communications, the narrowband physical downlink shared channel (NPDSCH) may provide for a maximum of 2048 repetitions.

The actual number of repetitions N (e.g. of the PDSCH sub-frames) used is defined by the standard but is typically variable. The number of repetitions being used by the eNB is signalled in the downlink control information (DCI) and is typically selected based on various channel quality metrics, known in the art per se, which will typically vary during operation.

As will be understood by those skilled in the art, rate matching refers to a process which is applied after data encoding in L1 (layer 1, physical layer of the telecommunications system) when the number of encoded bits that a transmitter wishes to transmit does not exactly match the physical resources available on a particular channel. The number of channel bits typically varies depending on the transmission mode, modulation etc. The transmitter places the encoded bits in a circular transmit buffer and these are retrieved in order until the number of bits required to fulfil the channel resources have been retrieved. When there are fewer channel bits than encoded bits to be transmitted, puncturing happens, which means that reading of data from the transmission buffer is stopped before all of the data has been retrieved—i.e. before the full circle has been read—and so a proportion a of the encoded bits are not transmitted.

On the other hand however, when there are more channel bits available than bits to be transmitted, the reading process reaches the end of the circle and continues around again so that some encoded bits are transmitted more than once, and rate matching gain is achieved. It is very rare for the number of channel bits to be an exact multiple of the number of encoded bits, thus typically some of the encoded bits—those following the point of the circular buffer where the data reading starts—are transmitted once more than those at the end of the buffer. Whereby rate matching gain is achieved With the enhanced coverage feature of LTE M1/M2 and NB1/NB2 referred to above, a given data block is repeated and transmitted many times by the transmitter. At the receiver side a rate de-matching (RDM) block incorporates a wrap-around buffer having a width corresponding to the number of channel bits into which a data array of soft bits are placed. Thus the first portion of the soft bits received and then accumulated once more than the last portion of the soft bits. The rate de-matched data is then combined and the different repetitions are combined.

A typical BL/CE UE operating in accordance with the standard is arranged to decode the data symbols repeated across the repeated sub-frames once all of the repetitions have been received, by combining the various repetitions to obtain an improvement in the SNR prior to decoding. However, the Applicant has appreciated that such devices may, in some cases, consume more power than is necessary by operating in this way.

In particular, when a BL/CE UE or non BL/CE UE is supporting the release 13 CE Mode A/Ce Mode B, i.e. repetitions or NB-IOT UE, downlink control channel monitoring and reception of data channel with long repetitions consumes a significant amount of power as blind decoding of the downlink control channel is required all the time when configured even if there is no control or data channel transmission for that particular UE.

SUMMARY OF THE INVENTION

When viewed from a first aspect, the present invention provides a method of operating a digital radio receiver comprising:
  receiving an encoded digital radio signal comprising a plurality of bits;
  determining a plurality of soft bits representing estimates of said bits;
  storing said soft bits in a rate de-matching buffer;

calculating a first linear combination of soft bits from a first subset of said rate de-matching buffer;

calculating a second linear combination of soft bits from a second subset of said rate de-matching buffer;

calculating a ratio between said first and second linear combinations;

comparing said ratio to an expected value; and determining an operational state of said digital radio receiver based on said comparison.

When viewed from a second aspect the invention provides a digital radio receiver arranged to:

receive an encoded digital radio signal comprising a plurality of bits;

determine a plurality of soft bits representing estimates of said bits;

store said soft bits in a rate de-matching buffer;

calculate a first linear combination of soft bits from a first subset of said rate de-matching buffer;

calculate a second linear combination of soft bits from a second subset of said rate de-matching buffer;

calculate a ratio between said first and second linear combinations;

compare said ratio to an expected value; and determine an operational state of said digital radio receiver based on said comparison.

Thus it will be seen by those skilled in the art that in accordance with the invention an operational state of the receiver can be determined by examining the ratio of the first and second linear combinations of soft bits. The Applicant has appreciated that the amount of rate matching applied to the signal prior to transmission is somewhat characteristic of the signal and that the ratio set out above can be indicative of the rate de-matching gain of the received signal which follows from this, as will be explained further below. By examining how close the ratio is to the theoretically expected value for a signal intended for that receiver, to which rate matching has been applied, an estimate can be made of the likelihood of the received signal being such a valid signal intended for that receiver. This estimate can then be used in determination of an operational state of the receiver.

In a set of embodiments the step of comparing the ratio to an expected value comprises comparing the ratio to one or more threshold values. By choosing a or the threshold value(s) within a reasonable margin of the theoretically expected value for a valid signal in particular circumstances, a decision can be made as to whether the received signal is sufficiently likely to be valid to carry out a particular action.

For example in a set of embodiments the comparison is used to determine whether the digital radio receiver is in a normal reception state in which it continues to receive radio signals or a rejection state in which parts of the receiver are powered down, partly or fully, so that radio signals are not received. Thus by appropriately setting a threshold value (e.g. corresponding to a suitable margin from the expected value), this may allow the receiver to save power by powering down if what it is receiving is either not a valid signal or is not intended for that receiver. In both cases the ratio set out above will typically be too far from the expected value. It will be appreciated that this may represent a significant power saving over a system which continues to receive and potentially try to decode either noise or weak signals or those which are intended for another receiver.

In one example of such embodiments a comparison with a first threshold value is made if the aforementioned CRC fails. If the calculated ratio deviates too far from the expected value in this situation, it reinforces the presumption that there is no valid message being transmitted and the receiver can stop monitoring the search space, thereby saving power. Thus a set of embodiments comprises, if a cyclic redundancy check fails, comparing a difference between the ratio and the expected value with a first threshold value and entering said rejection state if said difference is above said first threshold value. The greater certainty provided by the ratio comparison might further reduce the risk of a transmission being missed or may allow other criteria such as an SNR threshold to be relaxed slightly.

In another example a comparison with a second threshold value (i.e. one which will in general be different from the first threshold value mentioned above without implying that the features mentioned above need to be implemented in conjunction with this feature) is made if the aforementioned CRC passes but the received data has a different repetition level to that which is expected. If the ratio calculated in accordance with the invention deviates too far from the expected value in this situation, it reinforces the presumption that, for example, the receiver has received genuine DCI but that it is not intended for that UE. This can allow the receiver to avoid trying to decode it, thereby saving power, and to keep monitoring for relevant DCI. Thus a set of embodiments comprises, if a cyclic redundancy check passes, comparing a repetition level of said encoded radio signal with an expected repetition level and if said repetition level of said encoded radio signal is different from said expected repetition level. comparing a difference between the ratio and the expected value with a second threshold value and decoding said encoded radio signal if said difference is below said second threshold value.

In another, potentially overlapping, set of embodiments, the comparison is used to determine whether the digital radio receiver is in a normal processing state in which it is arranged to attempt decoding of received signals after all repetitions thereof have been received or an early processing state in which it is arranged to attempt decoding of received signals before all repetitions thereof have been received. In this situation the ratio set out above will be very close to the expected value such that there is a relatively high degree of likelihood that a valid signal has been accurately received and so can probably be successfully decoded.

It will be appreciated from the foregoing that typically the threshold value for the ratio used to decide between the normal reception state and the rejection state will be different from the threshold value used to decide between the normal processing state and the early processing state. Moreover in one case the threshold will represent a minimum difference between the expected and the calculated ratios and in the other case it will be a maximum difference. More generally a plurality of threshold values may be employed to determine between a plurality of operational states. This may include the states mentioned above and/or may include other states. The threshold could be applied to an absolute value of the difference between the calculated and expected ratio or could be dependent on which is greater than the other.

In a further set of embodiments the value of the difference between the calculated and expected ratio is used to determine further processing. For example the respective difference values can be used to choose between two possible messages for decoding by selecting that which has the smallest difference, rather than simply decoding each of them that has met a threshold.

Although in accordance with the invention the comparison of the calculated ratio with the expected value is used in determination of the operational state, it should be appreciated that this may not be the sole criterion. Other factors, including but not limited to the measured signal to noise ratio of the received signal, may also influence this determination.

The first and second subsets of soft bits should be understood as being at least partially different (i.e. at least one of them must contain a soft bit not contained in the other) but they can overlap. Preferably however the first and second subsets are completely distinct—i.e. have no overlap. The first and second subsets could be of different sizes but preferably they are the same size. The number of soft bits in each set will typically depend on a number of factors such as channel conditions, signal to noise ratio etc. and could be varied dynamically, In some embodiments however they number between 5 and 100—e.g. between 10 and 80—e.g. 64.

In a set of embodiments the first subset of soft bits are received before the second subset of soft bits. In a set of such embodiments the first subset of soft bits comprises those at the beginning of the rate de-matching buffer (i.e. those received first) and the second subset of soft bits comprises those at the end of the buffer (i.e. those received last). It is not essential for the first subset to include the very first soft bit(s) or for the second subset to include the very last soft bits—in other words there could be a gap at either or both ends. The advantage of using the first and last portions of the soft bits is that the rate de-matching buffer will typically wrap-around and so these two portions of soft bits will typically have been transmitted a different number of times as a result of rate matching as previously explained since the last portion of the soft bits will be in the part of the buffer which is incompletely filled (corresponding to the beginning part of the circular transmission buffer from which encoded bits are read to complete the channel bits). The Applicant has found that a ratio of these portions of the soft bits will in general reflect their dissimilar transmission repetitions.

As will be appreciated by those skilled in the, soft bits are typically a representation of the likelihood of a given bit having a given value which ranged from −1 to 1 with the sign of the soft bit indicating a zero or one (usually minus values indicating a zero and positive values indicating a one) and the absolute value indicating the degree of confidence in the chosen value. Thus, for example, a soft bit value of −1 would indicate that the bit in question is definitely zero, a value of −0.5 would indicate a zero with a 50% confidence level and a value of 0.75 would indicate a one with a 75% confidence level.

As set out herein, a linear combination of the respective subsets of soft bits is calculated. In a set of embodiments the linear combination comprises the mean of the absolute values of the respective soft bits. However other combinations are envisaged in which different weightings are applied to certain of the soft bits. For example if the second subset of soft bits contains some that were transmitted an additional time and some that weren't (as may be necessary if the wrap-around 'remainder' is too short) a weighting corresponding to an associated gain may be applied.

In a preferred set of embodiments, the radio receiver is an LTE radio receiver and the LTE radio receiver receives the radio signal from an eNB base station of an LTE network. In a set of embodiments the receiver is configured to support NB-IoT communication.

Certain embodiments of the invention will now be described, by way of example only, with reference to the accompanying drawings in which.

Figure 1:
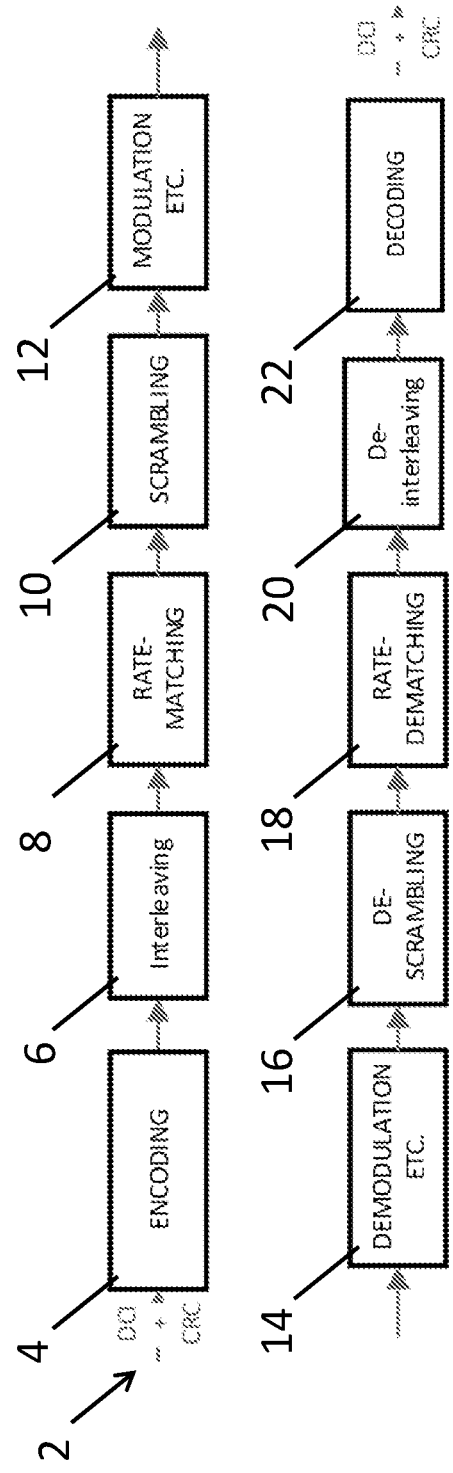
FIG. 1 is diagram illustrating where rate matching fits in the context of a digital radio communication system.

FIG. 1 shows a highly simplified representation of part of the physical layer of a digital radio communication system. By way of example a message 2 comprising Downlink Control Information (DCI) together with a corresponding Cyclic Redundancy Check (CRC) is passed to an encoding block 4 for encoding using any suitable scheme known per se in the art. The encoded data undergoes interleaving at block 6 and then enters the rate-matching block 8. As will described in more detail with reference to FIG. 2, this accounts for the typical mismatch between the number of encoded bits and the number of bits available in the physical channel being used. Thereafter the message goes through scrambling 10 and modulation 12 before being transmitted.

The reverse process Is carried out by the receiver—i.e. demodulation 14, de-scrambling 16 and rate de-matching 18 which is explained in more detail with reference to FIGS. 3 and 4. Thereafter the received signal undergoes de-interleaving 20 and decoding 22.

Figure 2:
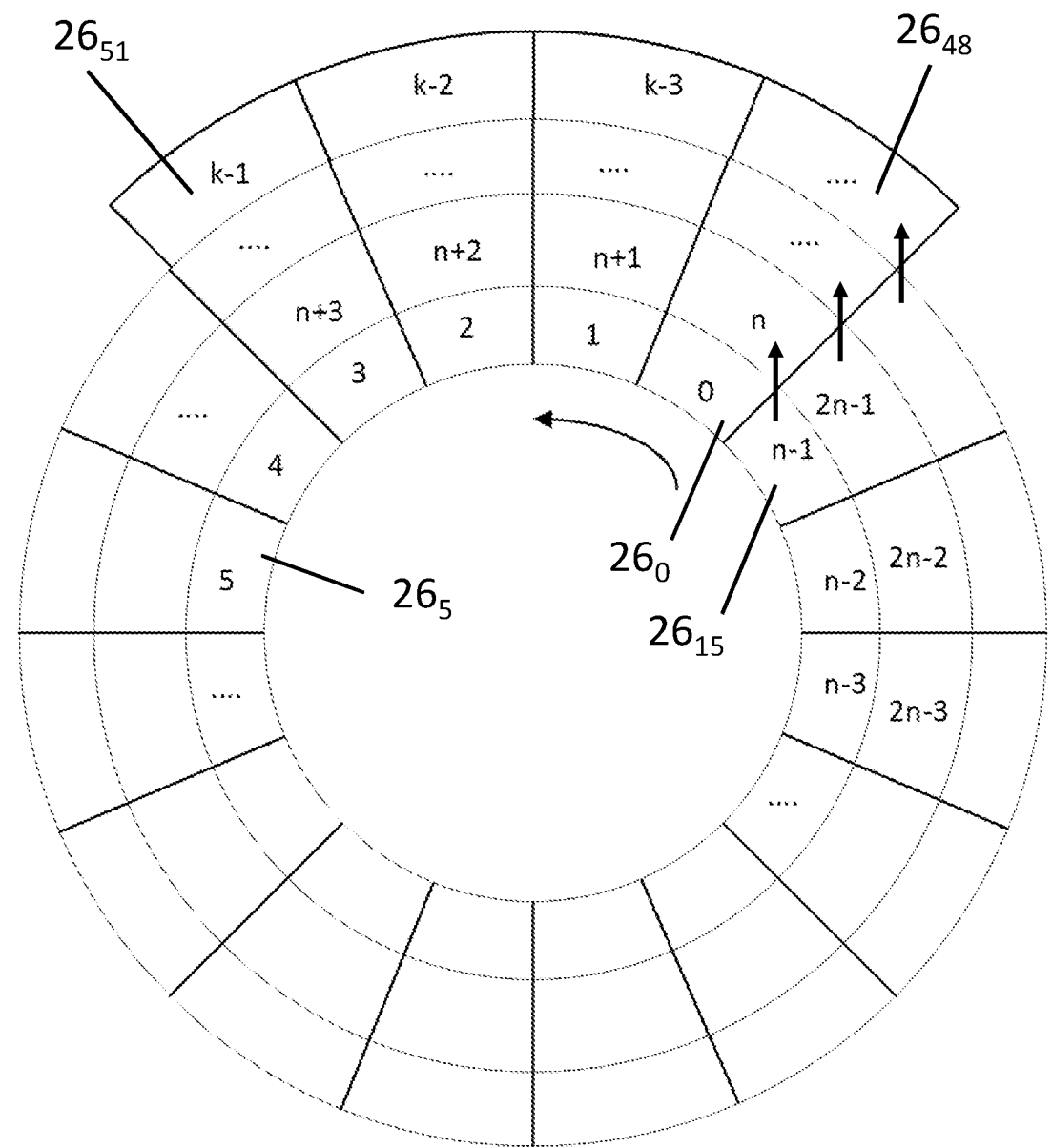
FIG. 2 is a diagrammatic representation of a circular transmitter buffer.

As illustrated in FIG. 2, in the rate matching block 8, the encoded bits for transmission are placed into a circular buffer 24. In this example there are sixteen encoded bits which are held in respective index positions 26 from zero to fifteen $26_0$ to $26_{15}$. In general there may be n encoded bits held in indices zero to n−1. However in this example the physical channel supports fifty-two bits in each transmission block. This number varies in general depending on the transmission mode, modulation scheme etc.

During transmission the transmitter reads the indices 26 from the buffer in turn (in an anti-clockwise direction in this Figure) starting at the zeroth index $26_0$. Once it reaches the last index $26_{15}$, the transmitter starts to read the indices again starting with index $26_{16}$, which is in fact identical to index $26_0$. Once another full circle has been completed, thirty two bits have been read. However since the channel capacity has not yet been filled, another cycle is completed so that all the bits are read for a third time. At this point, forty eight of the fifty two channel bits have been filled. Another cycle is then commenced. However as there are only four channel bits left, only the first four indices in the fourth cycle $26_{48}$ to $26_{52}$ are read.

Thus it will be appreciated that all of the indices are read at least three times, although four of them are read four times in 'filling up' the channel bits.

Figure 3:
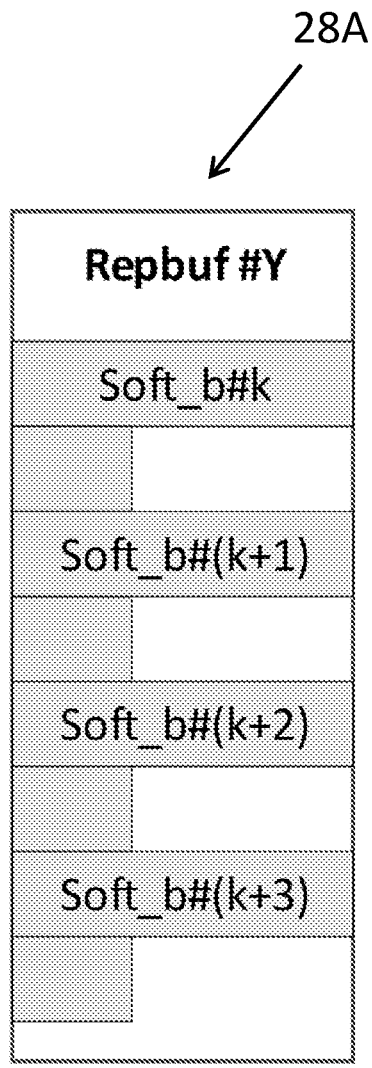
FIG. 3 is a diagrammatic representation of a wrap-around receiver buffer.
Figure 4:
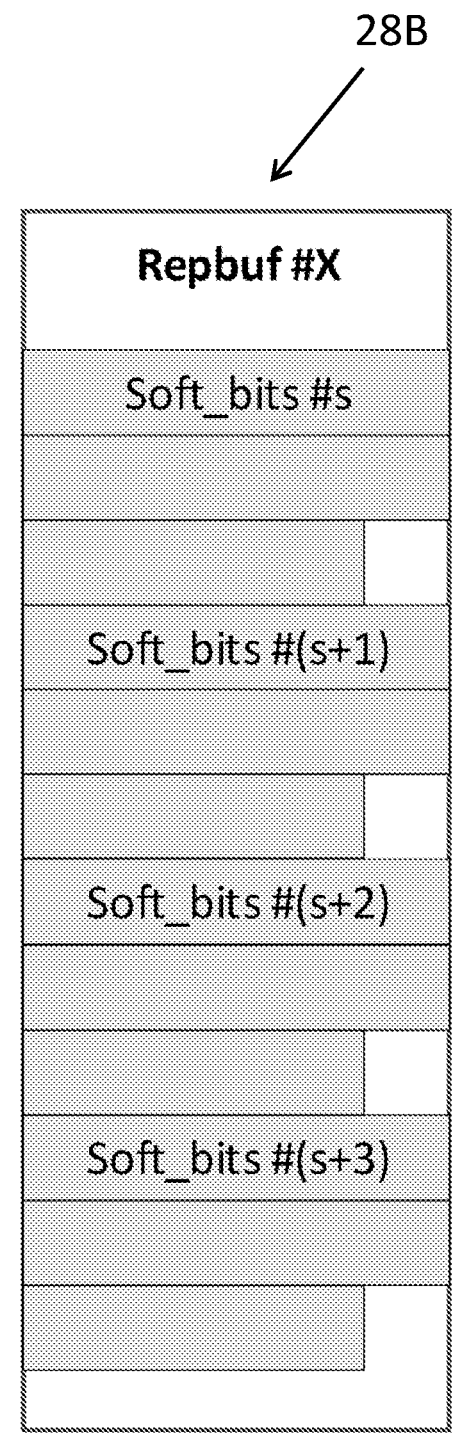
FIG. 4 is a diagrammatic representation of another embodiment of a wrap-around receiver buffer.

FIGS. 3 and 4 show diagrammatically two embodiments of the wrap-around buffer 28A, 28B. As will be understood by those skilled in the art, the receiver divides the received signal into respective symbols which represent soft bits. As previously explained, the soft bits are numerical representations of the receiver's estimate of the value of the bit together with the certainty level associated with that value. In the buffer 28A shown in FIG. 3, eight separate 30 rows are shown, pairs of which correspond to a particular transmission block. The width of the buffer 28A corresponds to the number of encoded bits which are expected and therefore the buffer wraps around if more bits than this are received in a particular transmission block. As will be appreciated, FIG. 3 illustrates the situation where all of the indices are received at least once and a proportion of them (e.g. 40%) are received twice.

With reference back to FIG. 2, this corresponds to the transmission buffer being read for one full cycle and partly read for a second cycle. As some of the indices are received more than once, these will typically have an enhanced certainty compared to those which are only received once. This is known as rate de-matching (RDM) gain. In this example the RDM gain is 1.4.

Taking into account the number of symbols which may be combined to arrive at the final bit prediction, the first 40% of the indices in the example of FIG. 3 are combined eight times. This arises because these indices are received twice in each repetition and there are four repetitions. The other indices are combined four times.

In accordance with the invention, two separate subsets of the indices are then selected. The first subset selected is taken from the first 40% of the indices and the second subset is taken from the remaining 60% of the indices. Conveniently, the first subset is taken from the beginning of the buffer and the second subset is taken from the end of the buffer.

Next, the absolute values of the indices in the respective subsets are calculated. This removes the differences between 0s and 1s in the original transmission. Thereafter, the mean of these absolute values is calculated for each of the two subsets separately. The values of these means should therefore represent the average certainty value associated with each subset. Since one of the subsets in this example is transmitted twice whereas the other subset is transmitted once, it would be expected that the mean of the absolute values of the first subset is, in theory, twice the mean of the absolute values of the second subset. In other words, the ratio of the two means of the absolute values should theoretically be two.

By measuring the actual value of this ratio, an assessment can be made as to whether the received signal does indeed have the expected rate de-matching gain of 1.4 and an assessment can also be made of the level of noise. If either the signal has a different RDM gain or there is a lot of noise, the measured ratio will not be very close to the theoretical value of two. On the other hand, if the signal has the correct RDM gain and has been transmitted with little noise, the ratio will be close to that which is expected. The value of the ratio which is calculated from the received signal can therefore be used to assess whether a valid signal has been received. As will be explained later with reference to FIGS. 5-7, there are a number of ways in which this assessment can be used depending on the particular application.

FIG. 4 illustrates another embodiment of the invention where the reception buffer 28B is used to receive a signal which has an RDM gain of 2.73. This means that 73% of the indices are received three times, whereas the remaining 27% are received only twice. Again, there are four repetitions so that the first symbols in the buffer are combined 12 times and the last symbols in the buffer are only combined eight times. This gives rise to a theoretical ratio between the mean of the absolute values of subsets taken from the first symbols and the last symbols, as previously described, having a value of 1.5 in this example. Again, this can be compared against the actual value which is measured to determine the validity and strength of the signal received.

Although, most conveniently, the subsets used are those at the beginning and end of the buffer, this is not essential and subsets taken from other respective parts of the buffer can be used as long as the subsets are at least partly different from one another. Similarly, although it is most convenient to take the first subset of indices entirely from those which are transmitted one more time than the entire second subset, this is not essential as it is possible in theory to weight the values according to the proportions which have been accumulated X times versus those which have been accumulated X−1 times.

Figures 5A, 5B, 5C:
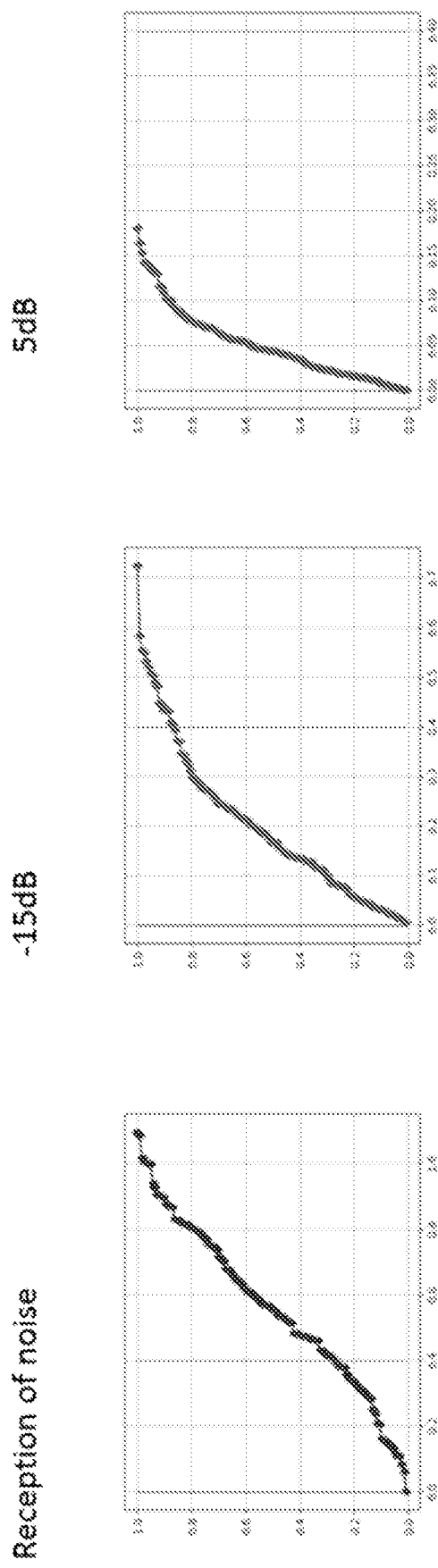
FIGS. 5a to 5c are example plots of a cumulative fraction of ratio error in a simulation.

Turning to FIGS. 5a-5c, there may be seen respective plots showing the cumulative fraction of repetitions against RDM ratio error for different signal levels. Thus, FIG. 5a illustrates the situation where there is no valid signal and thus only random noise is received. Assuming the theoretical ratio to be two (as in the example of FIG. 3), and setting an arbitrary threshold at an error of 0.4, it can be seen that in FIG. 5a only 30% of the repetitions fall inside this threshold. This could then be taken as an indication that there was no valid signal present. On the other hand, in FIG. 5b, a valid signal is present with a noise level of −15 dB. In this situation, applying the same threshold of 0.4 to the RDM ratio error, it may be seen that 90% of the repetitions give a value inside the threshold. This can therefore be taken as an indication that there is a valid signal present and appropriate action taken.

Finally, FIG. 5c shows the situation where the noise level is only −5 dB and here it may be seen that in fact all of the measurements are within 0.2 of the expected value for the ratio, then again clearly indicating a valid signal has been received.

Figure 6:
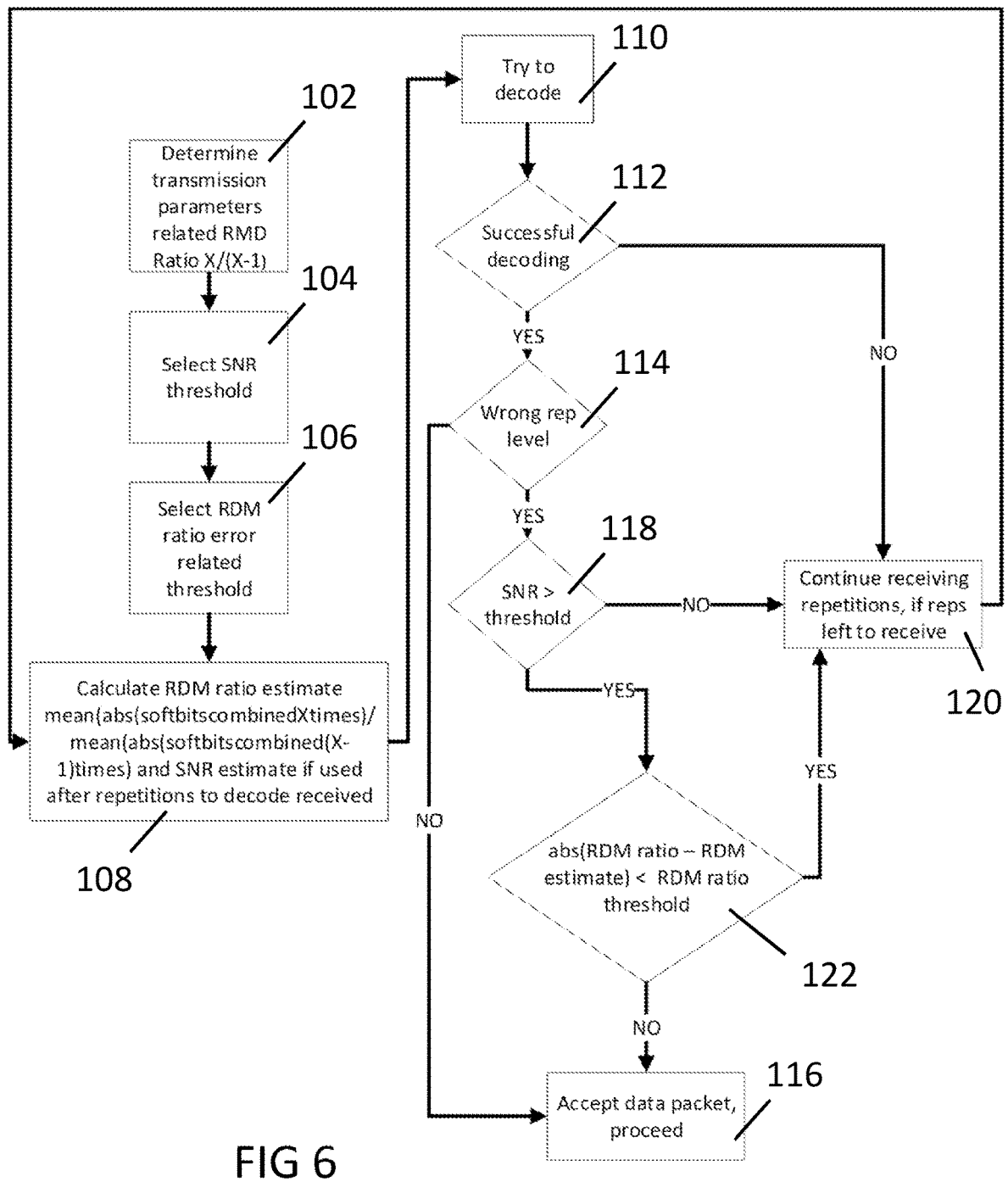
FIG. 6 is a flow chart describing operation of an embodiment of the invention.

FIG. 6 illustrates a flow diagram describing an embodiment of the invention in which the above-mentioned ratio is used. This embodiment uses the ratio to determine whether a signal has been falsely assumed to be a valid signal but is in fact not a valid signal and therefore should not be decoded. This can be very useful in practice in avoiding the power consumption associated with decoding an invalid signal.

First, at step 102, the receiver calculates or selects from a table transmission perimeters related to the signal that it is expecting to receive and therefore calculates a related expected RDM ratio—i.e. X/(X−1), where X is the maximum number of times a particular symbol is repeated during each transmission block. This is therefore the theoretical value of the RDM ratio which is discussed above.

Second, at step 104, the receiver may select a threshold for the signal to noise ratio (SNR) which may be a threshold common to all signals or it may be one set taking into account the repetition level of the particular signal expected. As those skilled in the art will appreciate, the higher the repetition level, the greater the SNR that can be expected in general.

Next, at step 106, the receiver selects an RDM ratio error threshold, that is a threshold for the maximum difference between the theoretical value of the RDM ratio and the actual value measured which will be used to decide whether the signal is valid or not. Again, this could be a generic threshold or it could be set depending upon the repetition level and/or the SNR of the expected signal. At step 108, the RDM ratio is calculated for the actual signal which is received, assuming this signal has exceeded the SNR threshold if that is used. As explained earlier, this ratio is calculated by taking the absolute values of bits in the first part of the buffer and calculating their mean and doing the same to the absolute values of bits from the last part of the buffer and then calculating the ratio between them. Then the transmitted tries to decode the signal at step 110.

If decoding is successful at step 112, i.e. the CRC check passes, the receiver goes on at step 114 to determine whether the repetition level of the decoded signal is consistent with what is expected. This might be indicated in the message itself—e.g. if it is DCI or might have been indicated in a previous DCI message or otherwise be known in advance.

Although this embodiment uses a repetition level check, this is optional. It could simply be omitted If the repetition level is correct then the receiver accepts the data packet at step 116 and proceeds as normal. However, if the repetition level is wrong then it proceeds at step 118 to determine whether the SNR is greater than the threshold previously determined at step 104.

If the SNR is below the threshold then the receiver continues at step 120 to receive further repetitions if there are more repetitions left to receive and then reverts to step 110 where the RDM ratio estimate is carried out. However, if the SNR is greater than the threshold (i.e. indicating a strong signal) it proceeds to step 122 and calculates the absolute value of the difference between the measured ratio and the theoretical value and compares this to the ratio error threshold set at step 106. If the error is small enough, then the data package is accepted at step 116, otherwise the receiver moves to step 120 to continue to receive further repetitions if there are any.

Thus, it will be seen that in this embodiment, the RDM ratio error is used to decide whether the received signal represents a false alarm—i.e. one in which the signal passes the CRC with the wrong repetition number but with a signal to noise ratio higher than the minimum threshold. This indicates a strong signal and the RDM error ratio is used to decide whether or not to accept the message—for example, DCI—or to reject it and continue monitoring for a subsequent message. Rather than comparing the absolute value of the difference between the measured RDM ratio and the theoretical value, the sign of this difference could be taken into account—i.e. account taken of which of them is higher in order to draw a suitable conclusion.

Figure 7:
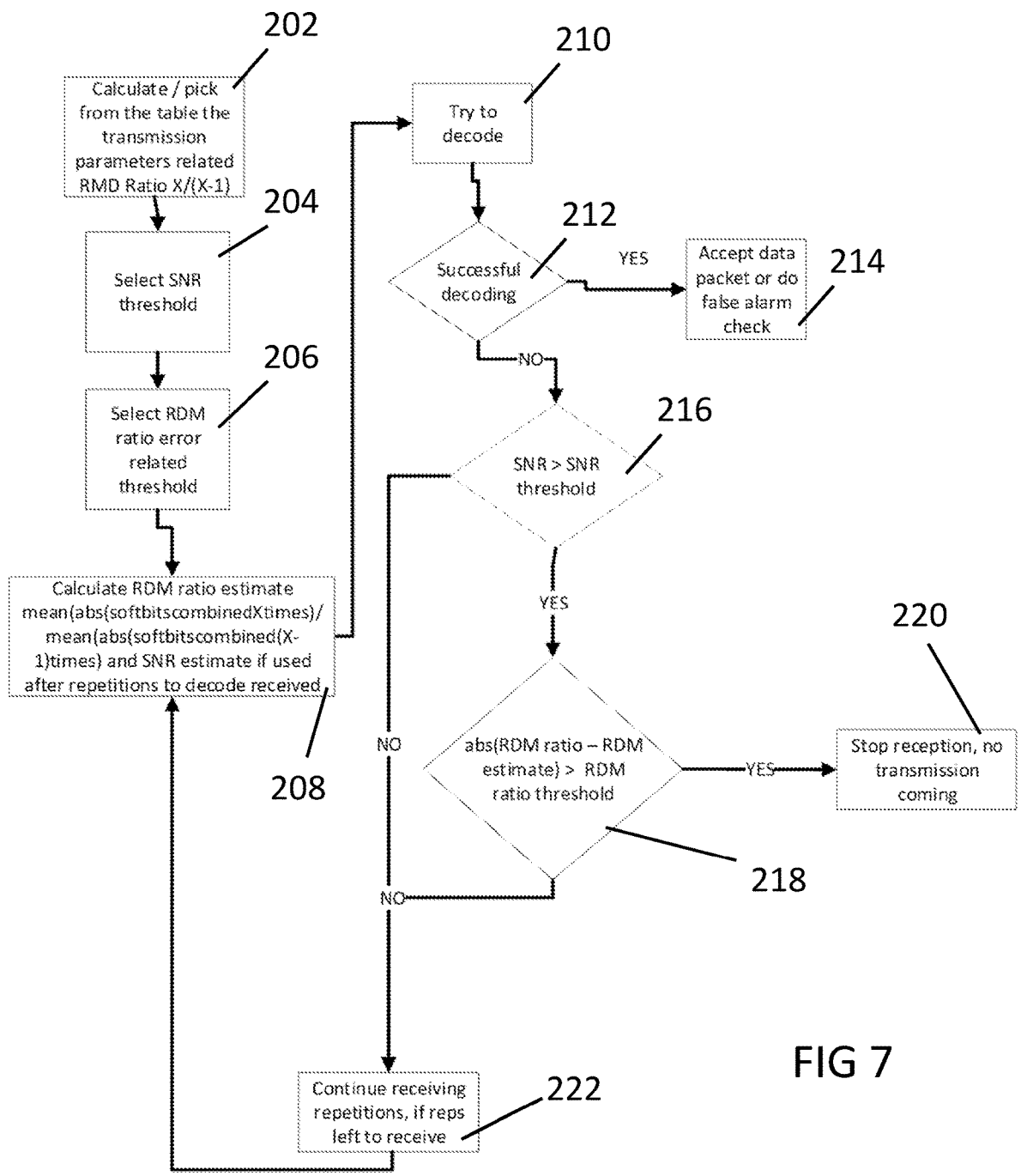
FIG. 7 is a flow chart describing operation of another embodiment of the invention.

FIG. 7 illustrates another possible use case of the RDM ratio comparison described herein which can be used in conjunction with the process described with reference to FIG. 6. In common with the previous embodiment, the appropriate transmission perimeters and related RDM ratio are first selected or calculated in step 202 and an SNR threshold, either generic or specific to the repetition level used, is selected at step 204. At step 206, a suitable RDM ratio error related threshold is chosen which will in general be different to that described with reference to the previous embodiment.

An attempt is then made to decode at step 210. If at step 212 decoding is successful, then at step 214 the data package can be accepted or a further false alarm check as described with reference to FIG. 5 can be carried out. If, however, decoding is not successful—i.e. the CRC fails—but the SNR which is compared to the threshold at step 216 is higher than the minimum specified, then the absolute value of the difference between the calculated RDM ratio and the theoretical value is compared to the threshold at step 218. If the difference is greater than this threshold, the receiver moves at 220 to stop reception entirely as it can be inferred that there is no transmission coming—i.e. there is no real data to receive.

However, returning to step 216, if the SNR is below the minimum threshold, the receiver can move to step 222 and continue receiving further repetitions if there are further repetitions to receive, in order to increase the SNR. This is also the path followed if the RDM ratio error calculated at step 218 is smaller than the threshold value mentioned above in relation to step 206.

Although this embodiment uses an SNR threshold, this is optional. Other channel condition indicators could be used or this step could simply be omitted.

Thus, it will be appreciated that this embodiment of the invention allows the receiver to stop monitoring the search space when there is no real data to be received because it can be assumed that any apparent signal which is above the SNR threshold does not in fact contain any real data. This allows a reduction in the amount of power consumed which would otherwise have been used in continuing to monitor the search space. As with the previous embodiment, instead of using the absolute value of the RDM ratio error, the real value can be used instead.

Figure 8:
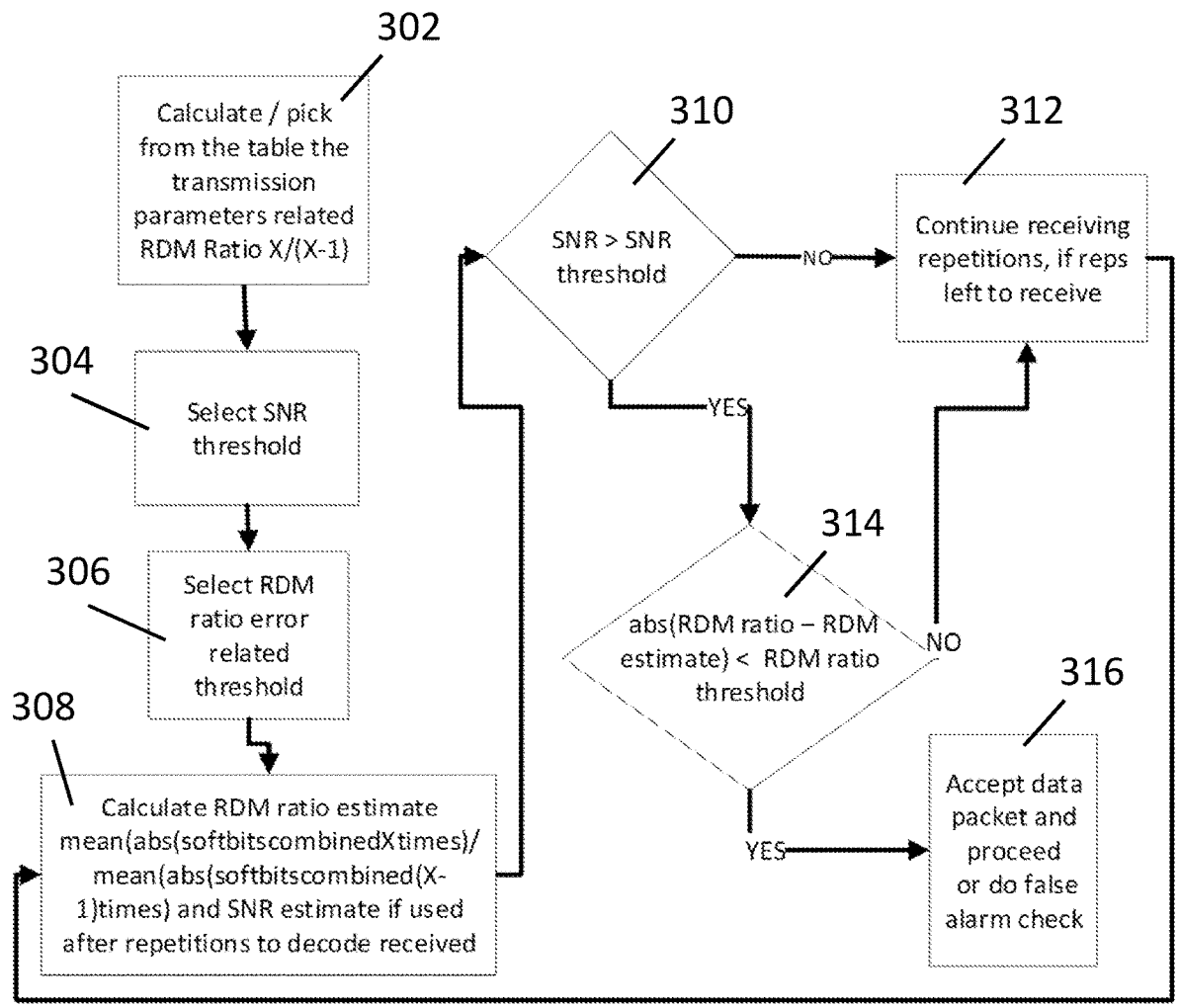
FIG. 8 is a flow chart describing operation of a further embodiment of the invention.

FIG. 8 shows a flow chart describing a further embodiment of the invention which can also be used in conjunction with one or other of the previously described embodiments. Here, the first three steps 302, 304 and 306 are the same as in the previous embodiments although, again, a different threshold is selected for the RDM ratio error. In step 308 the RDM ratio is again estimated based on the measurement of the ratio between the means of the absolute values of the soft bits which are combined different numbers of times as previously discussed.

At step 310, the SNR is compared to the SNR threshold and if it is lower than this threshold the receiver continues to step 312 in which it continues receiving repetitions if there are any left to receive and again returns to repeating the step at 308 of calculating the RDM ratio. If, however, the SNR is greater than the threshold, the RDM ratio is compared to the expected value at step 314. If there is a small difference—i.e. the error between the measured ratio and the expected ratio is below the small threshold chosen in this embodiment—it can be determined with relatively high certainty that the signal received is a valid one since it is likely to have the correct RDM gain. In this situation the receiver moves on to step 316 to accept the data packet and proceed to try to decode it or, if required, to carry out the false alarm check described with reference to FIG. 6.

If decoding is successful, i.e. the CRC passes, then the message can be used whereas if it fails then early decoding was not successful and monitoring can be continued. It will be appreciated, however, that if early decoding can be employed, a significant power saving can be achieved since it is not necessary to continue monitoring the search space for all of the repetitions in the event that a good signal has been received. As in previous embodiments, the absolute value of the error is used in this example but the real value could be used instead if desired.

Thus, it will be seen by those skilled in the art that the ratio described herein between a mean of the absolute values of the soft bits from two different parts of the received signal can be used as an indicator of the likelihood that the correct signal has been received and this can be used in order to decide how to continue processing—which may be to stop monitoring early, to try to decode early, or in some other way which saves power compared to simply receiving all repetitions of a potential signal and then seeking to decode it. Whilst particular embodiments of the invention have been described, these should not be taken as being limiting as there are many variants and modifications of the principles of the invention which can be implied within the scope of the attached claims.

The invention claimed is:

1. A method of operating a digital radio receiver comprising:
    receiving an encoded digital radio signal comprising a plurality of bits;
    determining a plurality of soft bits representing estimates of said bits;
    storing said soft bits in a rate de-matching buffer;
    calculating a first linear combination of soft bits from a first subset of said rate de-matching buffer;
    calculating a second linear combination of soft bits from a second subset of said rate de-matching buffer;
    calculating a ratio between said first and second linear combinations;
    comparing said ratio to an expected value; and
    based on said comparison, setting or maintaining the digital radio receiver in a normal reception state in which it continues to receive radio signals, or a rejection state in which parts of the receiver are powered down, partly or fully, so that radio signals are not received, or
    based on said comparison, setting or maintaining the digital radio receiver in a normal processing state in which it is arranged to attempt decoding of received signals after all repetitions thereof have been received or an early processing state in which the digital radio receiver is arranged to attempt decoding of received signals before all repetitions thereof have been received.

2. The method as claimed in claim 1 wherein the step of comparing the ratio to an expected value comprises comparing the ratio or a difference between the ratio and the expected value to one or more threshold values.

3. The method as claimed in claim 1 comprising, if a cyclic redundancy check fails, comparing a difference between the ratio and the expected value with a first threshold value and entering said rejection state if said difference is above said first threshold value.

4. The method as claimed in claim 1 comprising, if a cyclic redundancy check passes, comparing a repetition level of said encoded radio signal with an expected repetition level and if said repetition level of said encoded radio signal is different from said expected repetition level, comparing a difference between the ratio and the expected value with a second threshold value and decoding said encoded radio signal if said difference is below said second threshold value.

5. The method as claimed in claim 1 comprising calculating a value of a difference between the ratio and the expected value and using said difference value to determine further processing.

6. The method as claimed in claim 1 wherein the first subset of soft bits are received before the second subset of soft bits.

7. The method as claimed in claim 6 wherein the first subset of soft bits comprises those at the beginning of the rate de-matching buffer and the second subset of soft bits comprises those at the end of the buffer.

8. The method as claimed in claim 1 wherein the linear combination comprises the mean of the absolute values of the respective soft bits.

9. The method as claimed in claim 1 wherein the radio receiver is an LTE radio receiver and the LTE radio receiver receives the radio signal from an eNB base station of an LTE network.

10. A digital radio receiver comprising:
    a radio receiver portion arranged to receive an encoded digital radio signal comprising a plurality of bits; and determine a plurality of soft bits representing estimates of said bits;
    a rate de-matching buffer arranged to store said soft bits; and
    one or more processors, the one or more processor comprising:
        a first processing portion arranged to calculate a first linear combination of soft bits from a first subset of said rate de-matching buffer;
        a second processing portion arranged to calculate a second linear combination of soft bits from a second subset of said rate de-matching buffer;
        a third processing portion arranged to calculate a ratio between said first and second linear combinations;
        a fourth processing portion arranged to compare said ratio to an expected value; and
        a fifth processing portion arranged to, based on said comparison:
            set or maintain the digital radio receiver in a normal reception state in which it continues to receive radio signals or a rejection state in which parts of the receiver are powered down, partly or fully, so that radio signals are not received, based on said comparison; or
            set or maintain the digital radio receiver in a normal processing state in which it is arranged to attempt decoding of received signals after all repetitions thereof have been received or an early processing state in which the digital radio receiver is arranged to attempt decoding of received signals before all repetitions thereof have been received.

11. The digital radio receiver as claimed in claim 10 arranged to compare the ratio or a difference between the ratio and the expected value to one or more threshold values.

12. The digital radio receiver as claimed in claim 10 arranged, if a cyclic redundancy check fails, to compare a difference between the ratio and the expected value with a first threshold value and to enter said rejection state if said difference is above said first threshold value.

13. The digital radio receiver as claimed in claim 10 arranged, if a cyclic redundancy check passes, to compare a repetition level of said encoded radio signal with an expected repetition level and if said repetition level of said encoded radio signal is different from said expected repetition level, to compare a difference between the ratio and the expected value with a second threshold value and to decode said encoded radio signal if said difference is below said second threshold value.

14. The digital radio receiver as claimed in claim 10 arranged to calculate a value of a difference between the ratio and the expected value and to use said difference value to determine further processing.

15. The digital radio receiver as claimed in claim 10 wherein the first subset of soft bits are received before the second subset of soft bits.

16. The digital radio receiver as claimed in claim 15 wherein the first subset of soft bits comprises those at the beginning of the rate de-matching buffer and the second subset of soft bits comprises those at the end of the buffer.

17. The digital radio receiver as claimed in claim 10 wherein the linear combination comprises the mean of the absolute values of the respective soft bits.

18. The digital radio receiver as claimed in claim 10 wherein the radio receiver is an LTE radio receiver and the LTE radio receiver is arranged to receive the radio signal from an eNB base station of an LTE network.

\* \* \* \* \*